Jan. 25, 1938.  R. W. CANFIELD  2,106,547
GLASS MELTING FURNACE
Filed Sept. 12, 1936  3 Sheets-Sheet 1

Inventor:
Robert W. Canfield

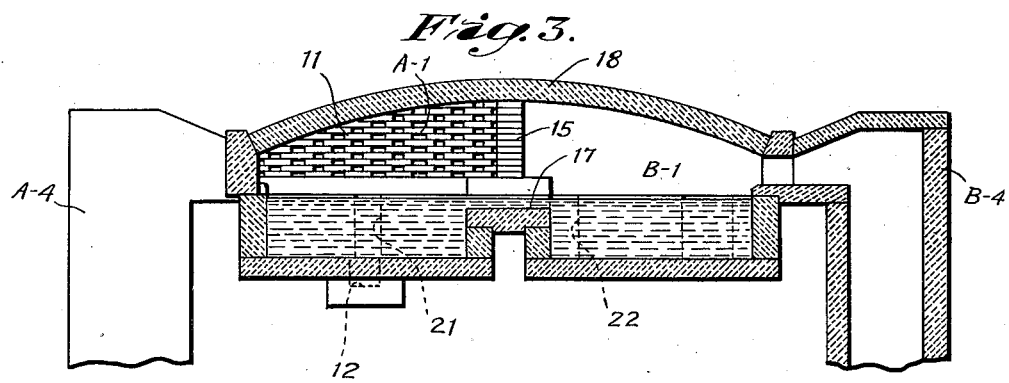
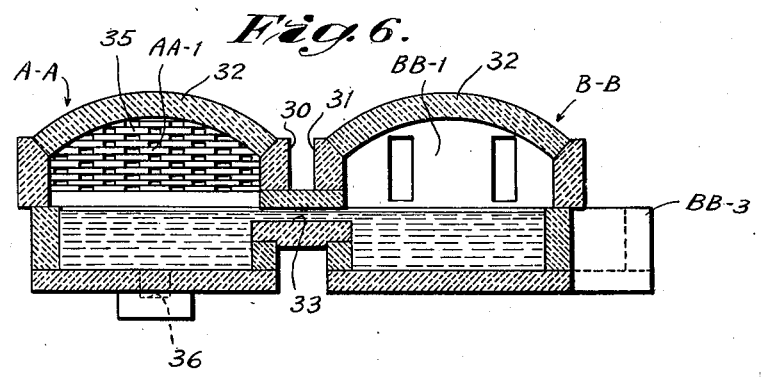

Jan. 25, 1938.  R. W. CANFIELD  2,106,547
GLASS MELTING FURNACE
Filed Sept. 12, 1936  3 Sheets-Sheet 3
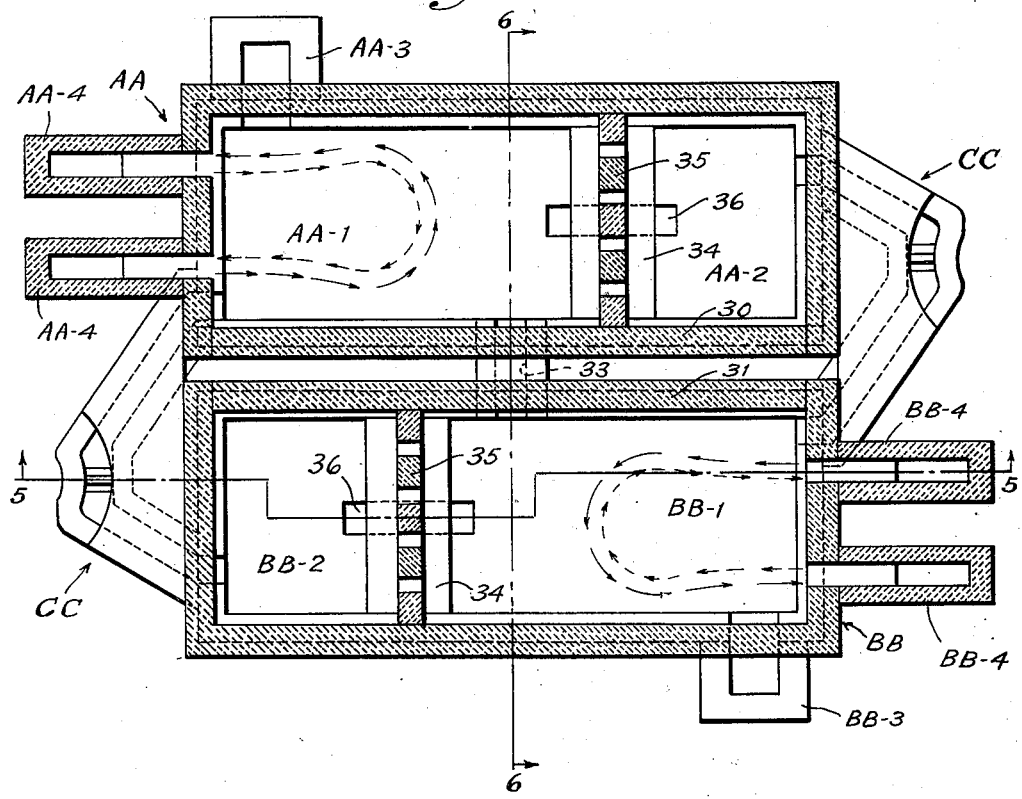
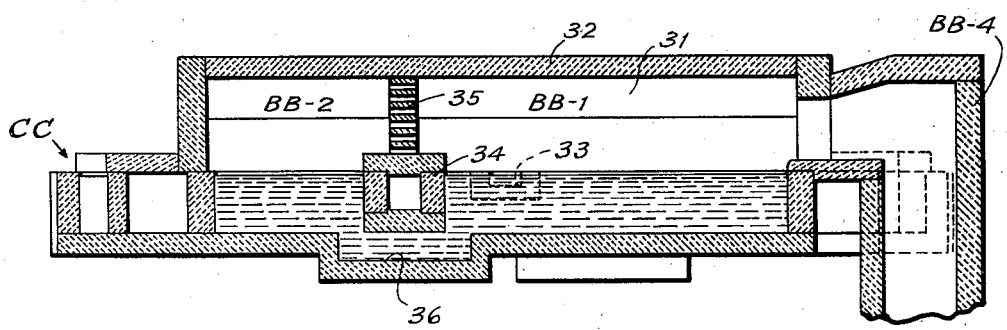
Inventor:
Robert W. Canfield
by Brown Markham
Attorneys
Witness:
W. B. Thayer Patented Jan. 25, 1938

2,106,547

UNITED STATES PATENT OFFICE 2,106,547

GLASS MELTING FURNACE

Robert W. Canfield, West Hartford, Conn., assignor to Hartford-Empire Company, Hartford, Conn., a corporation of Delaware Application September 12, 1936, Serial No. 100,407

15 Claims. (Cl. 49—54)

This invention relates to improvements in glass melting furnaces and it consists in the combinations, constructions and arrangements hereinafter described and claimed.

The invention has particular reference to glass melting furnaces for supplying molten glass to the molds or other suction gathering receptacles of associate glass machinery.

An object of the invention is to provide a glass melting furnace which will afford novel and effective facilities for supplying glass of suitable condition and temperature to successively presented suction gathering molds or other suction gathering receptacles of associate glass forming machinery, and for preventing the accumulation at the gathering place of the glass supply body of portions of glass which have been chilled as a result or prior glass gathering operations or which, irrespective of their relative temperatures, constitute excess portions of gathered glass which are discarded after having been separated from the retarded portions of gathered glass in such receptacles.

A further object of the invention is to provide an economical, efficient and generally improved furnace for supplying glass of proper condition and temperature to a plurality of separate associated glassware forming machines, particularly forming machines having suction gathering molds or receptacles.

A further object of the invention is to provide simple, convenient and reliable means for returning directly to a melting compartment of a melting furnace portions of glass which have been chilled as a result of glass gathering operations at the surface of a body of glass in a glass conducting extension or channel appurtenant to a refining compartment of the melting furnace or have been ejected from the gathering receptacles as excess portions of glass.

A still further object of the invention is to provide a glass melting furnace and associate heating means which will permit flames and heated products of combustion to be applied to glass in the melting and fusing stages along a path of a greater length for a furnace of a given length and width than has been possible prior to the present invention.

Other objects and advantages of the invention will hereinafter be pointed out or will become apparent from the hereinafter given description of specific examples of melting furnaces embodying the invention, as shown in the accompanying drawings, in which Figure 1 is a horizontal sectional view of one form of furnace constructed and adapted for operation in accordance with the invention;

Fig. 3 is a transverse vertical section substantially along the line 3—3 of Fig. 1;

Fig. 4 is a view similar to Fig. 1 but showing a somewhat different form of melting furnace;

Fig. 5 is a longitudinal vertical section along the line 5—5 of Fig. 4, and

Fig. 6 is a transverse vertical section along the line 6—6 of Fig. 4.

Figure 1:
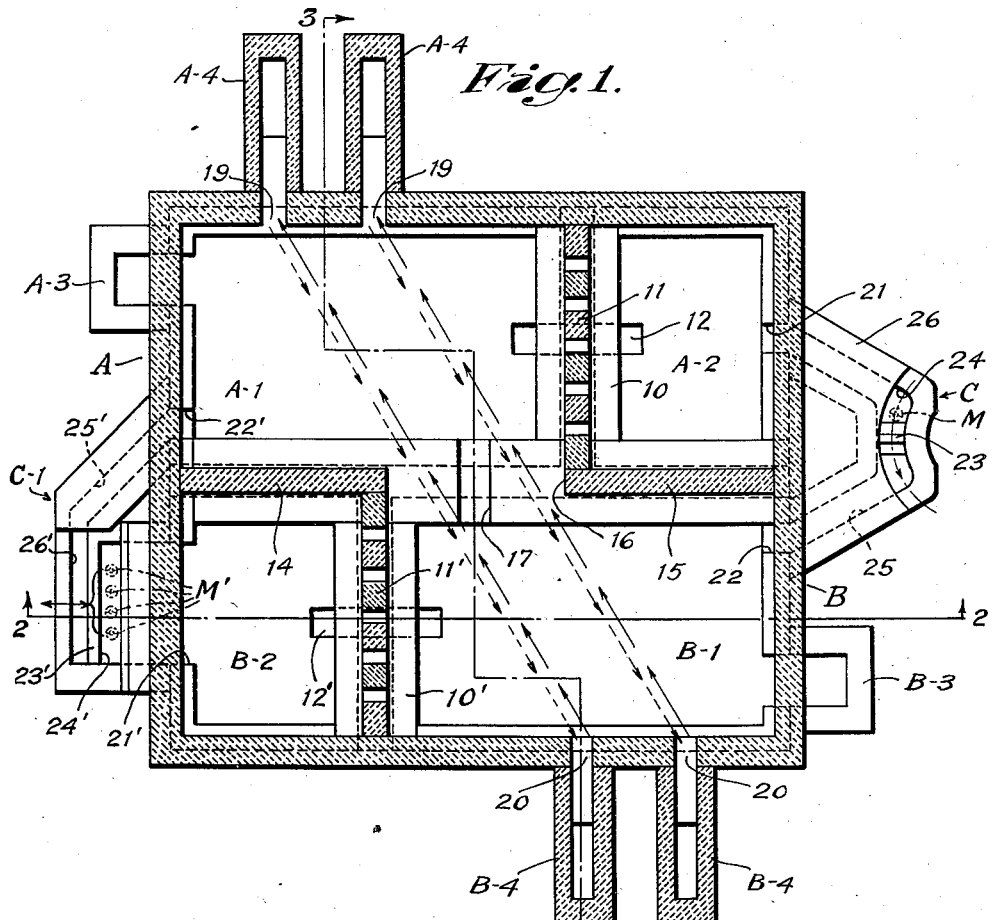
Figure 2:
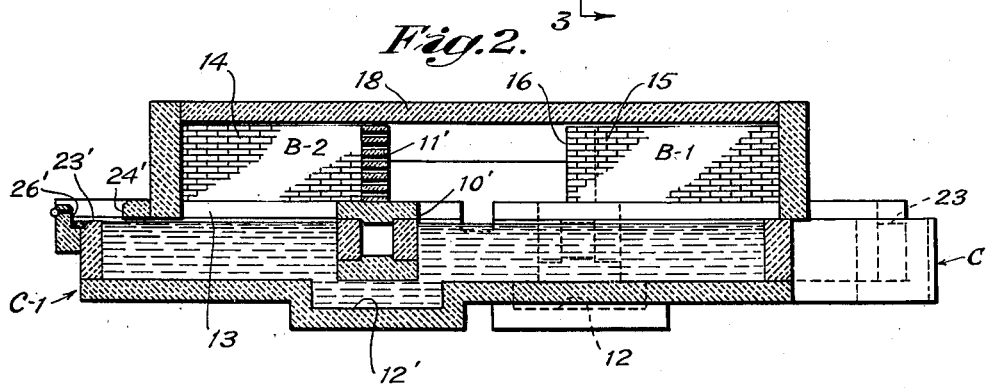
Fig. 2 is a longitudinal vertical section substantially along the line 2—2 of Fig. 1.

A melting furnace embodying the invention in the form shown in Figs. 1 to 3 inclusive, comprises a pair of juxtaposed or side-by-side tanks respectively designated A and B. Each of these tanks includes a melting compartment and a refining compartment, the melting compartments respectively being designaed A—1 and B—1 and the refining compartments respectively being designated A—2 and B—2. The melting and refining compartments of the tank A may be separated by a transverse bridge wall 10 and an overhead checker or apertured wall structure 11, leaving beneath the bridge wall a restricted submerged passage or throat 12 (Fig. 2) for the passage of glass from the melting compartment A—1 to the refining compartment A—2. The tank B has similar parts respectively designated 10′, 11′, and 12′.

Each of the tanks A and B is reversed endwise with respect to the other tank. That is, the refining compartment of each tank is at the same end of the furnace structure as the melting compartment of the other tank.

The tanks A and B may have a common longitudinally extended dividing wall 13 extending the full length of the furnace structure proper and of a sufficient height to extend from the bottom of the furnace structure to or above the highest level of glass in either of the tanks, as to the level of the tops of the bridge walls, as clearly shown in Fig. 2. In addition, longitudinally extending wall structures 14 and 15 may be superimposed on the wall 13 as imperforate partitions between the spaces above the bodies of glass in the refining compartment and portions of the melting compartments of the tanks. These walls 14 and 15 have their inner or adjacent ends spaced apart so as to provide an open passageway, indicated at 16, between the spaces above the glass in the melting compartments of the two tanks.

The longitudinal dividing wall 13 may be provided with a transverse passageway or opening 17 below the level of the glass in the melting compartments so as to permit equalization of level and, to some extent, of the temperature and condition of the glass in the two communicating melting compartments.

The furnace may have a crown or top wall 18 common to the two tanks, as best seen in Fig. 3. It will be understood that the dividing walls, crown or top wall and the outside walls of the furnace structure may be made of any suitable materials and may be constructed in any suitable known manner.

Glass-making materials or batch may be introduced into the respective melting compartments at the outer ends thereof, as through the doghouses which respectively are indicated at A—3 and B—3. Any suitable known batch-feeding means may be employed.

Pairs of cooperative regenerators A—4, A—4 and B—4, B—4 may be provided at the outer sides of the melting compartments of the two tanks, and, as shown, communicate with the respective melting compartments through the ports 19—19 and 20—20. The number of the regenerators associated with each tank may differ from that shown and the location of the regenerators may be predetermined and selected according to particular service requirements or results sought. In the particular structural arrangement shown, the regenerators for each melting tank are located somewhat nearer to the doghouse or batch-receiving end thereof than to the opposite end.

With the arrangement shown, flames from the regenerators A—4, A—4 for the tank A enter the tank A through the ports 19—19, and these flames and the heated products of combustion may travel diagonally across the melting compartment A—1 through the passage 16 and diagonally across the melting compartment B—1 to the ports 20—20 of the regenerators B—4. On reversal of the regenerators, as is usual in the operation of regenerative furnaces, flames will pass from the regenerators B—4, B—4 through the ports 20—20, into the melting compartment B—1, and such flames and the heated products of combustion will move diagonally across the communicating melting compartments B—1 and A—1 to the ports 19—19 of the regenerators A—4, A—4. By this arrangement, the glass in the communicating melting compartments A—1 and B—1 may be subjected to flames and heated products of combustion over a relatively long path of travel between regenerators in a furnace structure having a given width and length. This is particularly desirable for certain types of fuel, such as producer gas, and also is desirable as affording means for securing desirable heating effects and economy of fuel.

Heat from the melting compartments may pass through the aperture of the checker walls 11 and 11' into the respective refining compartments, and if desired, additional heating means (not shown) may be provided for the refining compartments of the tanks.

A channel structure C connects the refining compartment A—2 with the melting compartment B—1 at one end of the complete furnace. A channel structure C—1 connects the refining compartment B—2 with the melting compartment A—1 at the opposite end of the complete furnace structure.

The channel structure C has a glass flow passage which communicates at one end with the refining compartment A—2 below the level of the glass in the latter, as through a port 21, and communicates at the other end with the melting compartment B—1 below the level of the glass in the latter, as through the port 22. This glass conducting passage of the channel structure C may be provided at an outer portion of such structure with a transverse dividing wall 23 which, as indicated in Fig. 2, may extend to the level of the glass in the associate compartments of the tanks A and B. With this arrangement, the portion of the glass conducting passage of the structure C between the partition 23 and the port 21 constitutes a supply passage, designated at 24, for receiving glass from the refining compartment A—2. The remainder of the passage of the structure C, i. e., the portion thereof between the dividing wall 23 and the port 22 is designated 25, and constitutes a return passage for delivering to the melting compartment B—1 glass which has been carried over the wall 23 from the passage 24 to the passage 25 or has been dropped into the latter from the glass gathering molds or receptacles that have been employed to obtain glass from the passage 24.

With the arrangement decribed, the structure C is substantially of U shape. The structure C may be provided with a cover 26 to conserve heat, this cover being cut away above the outer adjacent ends of the passages 24 and 25, so that molds or gathering receptacles on an associate suction machine may be swung in an arc of a circle above exposed adjacent portions of the passages 24 and 25, and such molds or gathering receptacles, represented by that shown more or less diagrammatically at M, Fig. 1, may be lowered successively to position to gather glass from the supply body in the passage 24. The movement of the gathering molds or receptacles would be anti-clockwise. Thus, suction molds or receptacles may suck up glass from the supply body in the exposed portion of the passage 24 and then may move across the dividing wall 23 and over the exposed portion of the passage 25, so that the chilled end portion of the connecting glass between the gathered glass and the supply body may, when cut, fall into the passage 25. Also, the movement of each mold or receptacle to effect a gathering operation would set up a movement of glass in the outer portion of the passage 23 which would tend to force adjacent chilled portions of glass therein over the dividing wall 23 into the passage 25. The portions of glass delivered to the passage 25 will move along the latter into the melting compartment B—1, in which the movement of glass will be in the opposite direction or toward the refining compartment B—2.

The glass supplying structure described is particularly well adapted for use with suction machines of the type which employs the "fill and empty" method, i. e., which are filled by suction at the gathering station and thereafter eject from their cavities a portion of the glass which has been gathered and separated from the glass of the supply body.

With the structure shown, the excess separated relatively cold or chilled bits or portions of glass ejected from molds or gathering receptacles of a machine making use of the "fill and empty" method may be delivered to the passage 25 for return to the melting compartment B—1.

The chilled portions of glass returned to the melting compartment B—1 are there subjected to heat which will cause them to be brought to the temperature of the glass with which they are to be combined, and moreover such glass cannot pass to the refining compartment of the tank B without traversing practically the entire length of such tank, including the submerged throat 12'.

The channel structure C is, as aforesaid, adapted for use with suction gathering machines of the rotary type, the molds or gathering receptacles of which are moved in a circle. The channel structure C—1 at the opposite end of the furnace is adapted for use with machines of the reciprocating type, i. e., machines having molds or suction gathering receptacles which are moved back and forth substantially in a straight line for their glass gathering operations.

As shown, the structure C—1 has a substantially rectangular supply passage or refining compartment extension 24' and a return passage 25', which communicates with the interior of the melting compartment A—1 through a port 22'. The outer portion of the passage 25', indicated at 26, is located at the outer end of the passage or glass holding extension 24'. The portion 26' of the passage 25' and a portion of the passage or glass holding extension 24' are left uncovered, at least during the time glass gathering operations are to take place, the remainder of the structure C' being covered, as shown.

In the structure C', the glass in the passage or glass holding extension 24' may be separated from the portion 26' of the passage 25' by a dividing wall 23'. Molds or receptacles, represented by those shown at M', Fig. 1, on moving inward to a glass gathering position, may be filled with glass from the passage or glass holding extension 24', and then may eject excess separated bits or portions of glass into the portion 26' of the passage 25 as such molds or receptacles move outwardly from their glass gathering positions. Also, the molds or gathering receptacles, in gathering glass from the supply body in the extension 24' and moving outward, may carry into the delivery end 26' of the passage 25 the cut end of the connecting tails and the adjacent portions of glass which have been chilled as a result of glass gathering operations, whether or not such molds or gathering receptacles employ the "fill and empty" method. The movement of glass in the refining compartment B—2 will, of course, be outward into the passage or extension 24', while the movement of glass from the passage 25' will be inwardly along the latter to the melting compartment A' in which the movement is toward the refining compartment A—2.

If desired, the dividing walls 23 of the structure C and 23' of the structure C' may terminate below the level of the glass supply bodies in the delivery portions of these structures or may be omitted entirely, thus permitting more or less continuous circulatory movements of glass from the refining compartment of each tank through the external channel structure to the melting compartment of the other tank. Also, if desired, stirrers or circulators of any suitable structure and mode of operation, many examples of which are known in the art, may be employed positively to effect and/or control the circulatory movements of glass along the passages of the external channel structures C and C'.

The second illustrative embodiment of the invention, shown in Figs. 4 to 6 inclusive, comprises two juxtaposed tanks AA and BB, which are completely separated from each other above the level of the glass therein by their adjacent side wall structures, indicated at 30 and 31, each tank being provided with an individual crown 32. The melting comparements AA—1 and BB—1 of the two tanks are, however, connected below the glass level by a passage 33 for equalizing the level and tending to equalize the condition of the glass in these two compartments. The tanks have refining compartments AA—2 and BB—2, each of which is separated from the melting compartment of the same tank by a bridge wall 34 and an overlying checker structure 35, substantially as previously described. This provides each tank with a submerged throat or restricted passage 36 through which glass moves from the melting compartment to the refining compartment of the tank.

Each tank is provided with a doghouse AA—3 or BB—3 which is shown as being located at the side of the tank adjacent to the outer end of the melting compartment although it may be located at any suitable place. The feeding of the glass-making materials or batch to the melting compartments through these doghouses may be effected in any suitable known way.

Each tank is provided with a pair of regenerators, designated AA—4, AA—4 and BB—4, BB—4, for the respective tanks, which communicate with the interior of the melting compartments through suitable ports, as clearly shown. These regenerators may be operated so as to apply a horse-shoe type of flame to the interior of each of the melting compartments, the flame entering such melting compartment from each of the associate regenerators in turn and the products of combustion having egress therefrom through the other regenerator.

The furnace comprising the tanks AA and BB may have suitable glass supply and return channel structures at the opposite ends of the complete furnace. As shown, the channel structures are similar to that designated C in Fig. 1, and hereinbefore described as being adapted for supplying glass to suction machines of the rotary type. These channel structures in the embodiment of the invention shown in Figs. 4 to 6 inclusive, therefore, are designated CC and need not be further described.

The particular structures shown in the drawings and herein described are illustrative only and the invention is not to be limited beyond the terms of the appended claims.

What I claim is:

1. A glass melting furnace comprising a pair of juxtaposed tanks, each having longitudinally aligned glass melting and glass refining compartments, each of said tanks being reversed endwise with respect to the other, so that its glass refining portion is located along side of the glass melting portion of the other tank and a glass level equalizing connection between the melting compartment of the tanks.

2. A glass melting furnace comprising a pair of juxtaposed tanks, each having longitudinally aligned glass melting and glass refining compartments and each being reversed, end for end, with respect to the other, means for presenting glass from the refining portion of one of said tanks in position to be gathered by suction molds or receptacles of an associate suction machine, and means for returning to the adjacent or outer end portion of the melting compartment of the other tank chilled bits or portions of glass left after the gathering of glass in said molds or receptacles or excess portions of glass expelled from said molds or receptaces after the gathering of glass therein.

3. A glass melting furnace comprising two juxtaposed tanks, each having longitudinally aligned glass melting and glass refining compartments and each being reversed, end for end, with respect to the other, a channel structure connecting the refining compartment of one tank with the adjacent or outer end portion of the melting compartment of the other tank, said channel structure being adapted to supply molten glass from the refining compartment of the first tank to suction gathering molds or receptacles, and to return to the outer end portion of the melting compartment of the second tank glass bits or portions which have been chilled as a result of glass gathering operations of said molds or receptacles or expelled and separated from other retained gathered glass quotas in said molds or receptacles.

4. A glass melting furnace comprising two juxtaposed tanks, each having longitudinally aligned glass melting and glass refining compartments and each being reversed, end for end, with respect to the other, a channel structure connecting the refining compartment of one tank with the adjacent end of the melting compartment of the other tank, said channel structure being adapted to supply molten glass from the refining compartment of the first tank to suction gathering molds or receptacles, and to return to the melting compartment of the second tank glass bits or portions which have been chilled as a result of glass gathering operations of said molds or receptacles, the melting compartments of said tanks having a glass level equalizing connection, each with the other.

5. A glass melting furnace comprising a pair of juxtaposed relatively reversed tanks, each having longitudinally aligned glass melting and glass refining compartments, channel structures at the opposite ends of said furnace, each channel structure being adapted to conduct molten glass from the adjacent refining compartment of one of the tanks to position to expose the surface of said glass to suction gathering molds or receptacles, and each of said channel structures being adapted to return to the adjacent or outer end portion of the melting compartment of the other tank chilled bits or portions of glass that have been produced as a result of the gathering of glass in said molds or receptacles.

6. A glass melting furnace comprising a pair of relatively reversed juxtaposed tanks, each having longitudinally aligned glass melting and glass refining compartments, glass channel structures at the ends of said furnace, each connecting the refining compartment of one tank with the melting compartment of the other tank, each of said channel structures having a transverse wall for dividing said channel structure into a glass supply passage in glass flow communication with the refining compartment of one of the tanks and a cooperative glass return passage in glass flow communication with the melting compartment of the other tank.

7. The method of supplying glass to suction gathering molds or receptacles, which comprises melting and refining glass concurrently so that a body of refined glass and a body of glass in the melting and fusing stage are produced in side-by-side relation, conducting glass from said body of refined glass to a place at which suction molds or receptacles may gather glass therefrom and delivering to the body of glass in the melting or fusing stage at an early part of such stage chilled bits or portions of glass that are produced by or as a result of glass gathering operations of said suction molds or receptacles.

8. A glass melting furnace comprising a substantially rectangular structure having within the confines thereof a pair of juxtaposed tanks, each comprising longitudinally aligned glass melting and glass refining compartments, and each being reversed, end for end, with respect to the other, so that the refining compartment of each tank is located at the same end of the furnace structure as the melting compartment of the other tank, a glass flow extension communicating with the refining end of each tank for holding a supply body of glass from which suction molds or receptacles may gather glass, and a glass flow structure adjacent thereto and communicating with the outer end portion of the melting compartment of the other tank for receiving and returning to said melting compartment chilled or excess bits or portions of glass delivered thereto by or as a result of the glass gathering operations of said molds or receptacles.

9. A glass melting furnace comprising a pair of juxtaposed tanks each having longitudinally aligned glass melting and glass refining portions, the glass melting portions of the respective tanks being located diagonally opposite each other and having communication with each other both above and below the level of the glass therein, and means for introducing a heating medium into the melting portion of one of said tanks at the outer side thereof and for withdrawing spent heated gases from the other melting compartment at a corresponding place at the outer side thereof.

10. A glass melting furnace comprising a pair of juxtaposed tanks each having longitudinally aligned glass melting and glass refining portions, the glass melting portions of the respective tanks being located diagonally opposite each other and having communication with each other both above and below the level of the glass therein, and reversible regenerators respectively located diagonally opposite each other and communicating with the respective melting compartments at the outer sides of the latter, the distance between the places of communication of said regenerators with the melting compartments being substantially greater than the width of either of said melting compartments.

11. A glass melting furnace comprising a pair of juxtaposed tanks each having longitudinally aligned glass melting and glass refining portions, the glass melting portions of the respective tanks being located diagonally opposite each other and having communication with each other both above and below the level of the glass therein, reversible regenerators respectively located diagonally opposite each other and communicating with the respective melting compartments at the outer sides of the latter, the distance between the places of communication of said regenerators with the melting compartments being substantially greater than the width of either of said melting compartments, and glass conducting means at each of the opposite ends of said furnace for conducting glass from the adjacent refining portion of one of said tanks to a glass gathering station and for returning to the melting compartment of the other tank chilled bits or portions of glass.

12. A melting furnace comprising a pair of juxtaposed tanks, each having longitudinally aligned glass melting and glass refining portions and each being reversed, end for end, with respect to the other, regenerative heating means for applying heat to the glass in said melting compartments, and a glass level equalizing connection between the melting compartments.

13. A glass melting furnace comprising a pair of juxtaposed tanks each having longitudinally aligned glass melting and glass refining compartments, each reversed, end to end, with respect to the other, a glass level equalizing connection between the melting compartments of the two tanks, means separating the spaces above the glass in the melting compartments of the two tanks, and means for applying heat to the glass in each of said melting compartments.

14. A glass melting furnace comprising a pair of juxtaposed tanks, each having longitudinally aligned glass melting and glass refining compartments, each reversed, end for end, with respect to the other, a glass level equalizing connection between the melting compartments of the two tanks, means separating the spaces above the glass in the melting compartments of the two tanks, and a reversible regenerative heating means associated with each of said melting compartments.

15. A glass melting furnace comprising a pair of juxtaposed tanks, each having longitudinally aligned glass melting and glass refining compartments, each reversed, end for end, with respect to the other, a glass level equalizing connection between the melting compartments of the two tanks, means separating the spaces above the glass in the melting compartments of the two tanks, a reversible regenerative heating means associated with each of said melting compartments and glass conducting means at each of the opposite ends of said furnace for conducting glass from the adjacent refining portion of one of said tanks to a glass gathering station and for returning to the melting compartment of the other tank chilled bits or portions of glass.

ROBERT W. CANFIELD.